United States Patent
Abedini et al.

(10) Patent No.: US 11,683,786 B1
(45) Date of Patent: Jun. 20, 2023

(54) PAGING OPTIMIZATION FOR NETWORK POWER SAVING

(71) Applicant: QUALCOMM Incorporated, San Diego, CA (US)

(72) Inventors: Navid Abedini, Basking Ridge, NJ (US); Muhammad Nazmul Islam, Littleton, MA (US); Jianghong Luo, Skillman, NJ (US); Naeem Akl, Somerville, NJ (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/456,939

(22) Filed: Nov. 30, 2021

(51) Int. Cl.
*H04W 4/00* (2018.01)
*H04W 68/00* (2009.01)
*H04W 68/02* (2009.01)
*H04W 16/28* (2009.01)
*H04W 52/02* (2009.01)

(52) U.S. Cl.
CPC ........... *H04W 68/02* (2013.01); *H04W 16/28* (2013.01); *H04W 52/0225* (2013.01); *H04W 68/005* (2013.01)

(58) Field of Classification Search
CPC . H04W 68/02; H04W 16/28; H04W 52/0225; H04W 68/005
USPC ........................................................ 370/329
See application file for complete search history.

(56) References Cited

U.S. PATENT DOCUMENTS

| | | | |
|---|---|---|---|
| 2022/0046582 A1* | 2/2022 | Shrivastava | H04W 72/23 |
| 2022/0046585 A1* | 2/2022 | Wu | H04W 72/23 |
| 2022/0303089 A1* | 9/2022 | Liao | H04W 48/16 |
| 2023/0037852 A1* | 2/2023 | Islam | H04W 68/02 |

OTHER PUBLICATIONS

Mads Lauridsen et al., Study of Paging Enhancements for UE Energy Saving in 5G New Radio, Apr. 2021, IEEE (Year: 2021).*

* cited by examiner

*Primary Examiner* — Mark G. Pannell
(74) *Attorney, Agent, or Firm* — Harrity & Harrity, LLP

(57) ABSTRACT

Various aspects of the present disclosure generally relate to wireless communication. In some aspects, a base station may transmit a paging early indication (PEI) via a plurality of transmission beams. The base station may monitor a plurality of reception beams for a PEI response. The base station may transmit, to a user equipment (UE) and when the PEI response is received from the UE via a reception beam of the plurality of reception beams, paging information. Numerous other aspects are described.

30 Claims, 7 Drawing Sheets

PAGING OPTIMIZATION FOR NETWORK POWER SAVING

FIELD OF THE DISCLOSURE

Aspects of the present disclosure generally relate to wireless communication and to techniques and apparatuses for paging optimization for network power saving.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a base station. The method may include transmitting a paging early indication (PEI) via a plurality of transmission beams. The method may include monitoring a plurality of reception beams for a PEI response. The method may include transmitting, to a user equipment (UE) and when the PEI response is received from the UE via a reception beam of the plurality of reception beams, paging information.

Some aspects described herein relate to a method of wireless communication performed by a UE. The method may include monitoring a group of reception beams. The method may include detecting a PEI based at least in part on monitoring the group of reception beams. The method may include transmitting a PEI response based at least in part detecting the PEI.

Some aspects described herein relate to a base station for wireless communication. The base station may include a memory and one or more processors coupled to the memory. The one or more processors may be configured to transmit a PEI via a plurality of transmission beams. The one or more processors may be configured to monitor a plurality of reception beams for a PEI response. The one or more processors may be configured to transmit, to a UE and when the PEI response is received from the UE via a reception beam of the plurality of reception beams, paging information.

Some aspects described herein relate to a UE for wireless communication. The user equipment may include a memory and one or more processors coupled to the memory. The one or more processors may be configured to monitor a group of reception beams. The one or more processors may be configured to detect a PEI based at least in part on monitoring the group of reception beams. The one or more processors may be configured to transmit a PEI response based at least in part detecting the PEI.

Some aspects described herein relate to a non-transitory computer-readable medium that stores a set of instructions for wireless communication by a base station. The set of instructions, when executed by one or more processors of the base station, may cause the base station to transmit a PEI via a plurality of transmission beams. The set of instructions, when executed by one or more processors of the base station, may cause the base station to monitor a plurality of reception beams for a PEI response. The set of instructions, when executed by one or more processors of the base station, may cause the base station to transmit, to a UE and when the PEI response is received from the UE via a reception beam of the plurality of reception beams, paging information.

Some aspects described herein relate to a non-transitory computer-readable medium that stores a set of instructions for wireless communication by a UE. The set of instructions, when executed by one or more processors of the UE, may cause the UE to monitor a group of reception beams. The set of instructions, when executed by one or more processors of the UE, may cause the UE to detect a PEI based at least in part on monitoring the group of reception beams. The set of instructions, when executed by one or more processors of the UE, may cause the UE to transmit a PEI response based at least in part detecting the PEI.

Some aspects described herein relate to an apparatus for wireless communication. The apparatus may include means for transmitting a PEI via a plurality of transmission beams. The apparatus may include means for monitoring a plurality of reception beams for a PEI response. The apparatus may include means for transmitting, to a UE and when the PEI response is received from the UE via a reception beam of the plurality of reception beams, paging information.

Some aspects described herein relate to an apparatus for wireless communication. The apparatus may include means for monitoring a group of reception beams. The apparatus may include means for detecting a PEI based at least in part on monitoring the group of reception beams. The apparatus may include means for transmitting a PEI response based at least in part detecting the PEI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
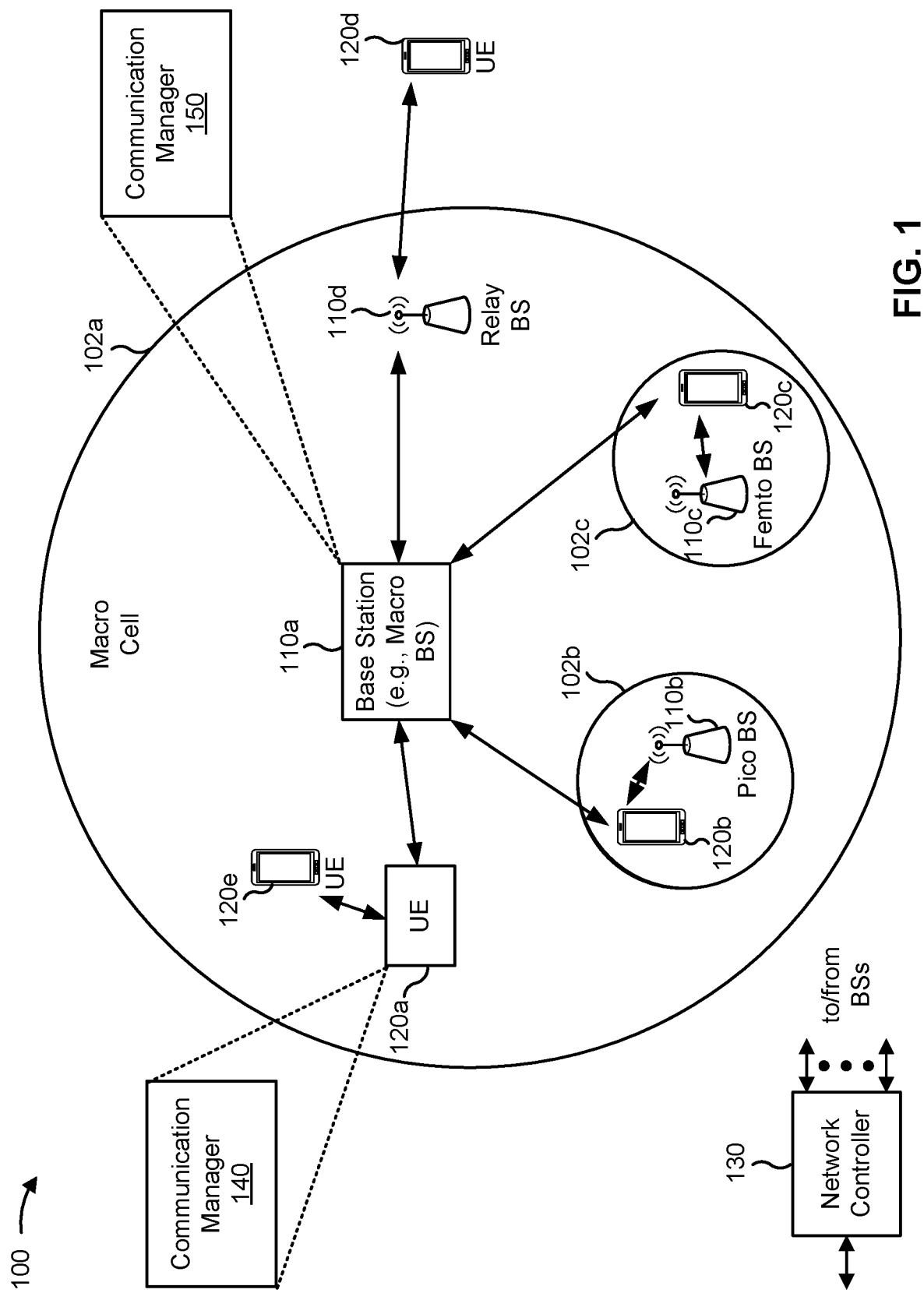
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with paging optimization for network power saving. Additionally, or alternatively, the communication manager 140 may perform one or more other operations described herein.

In some aspects, the base station 110 may include a communication manager 150. As described in more detail elsewhere herein, the communication manager 150 may perform one or more operations associated with paging optimization for network power saving. Additionally, or alternatively, the communication manager 150 may perform one or more other operations described herein.

As indicated above, FIG. 1 is provided as an example. Other examples may differ from what is described with regard to FIG. 1.

Figure 2:
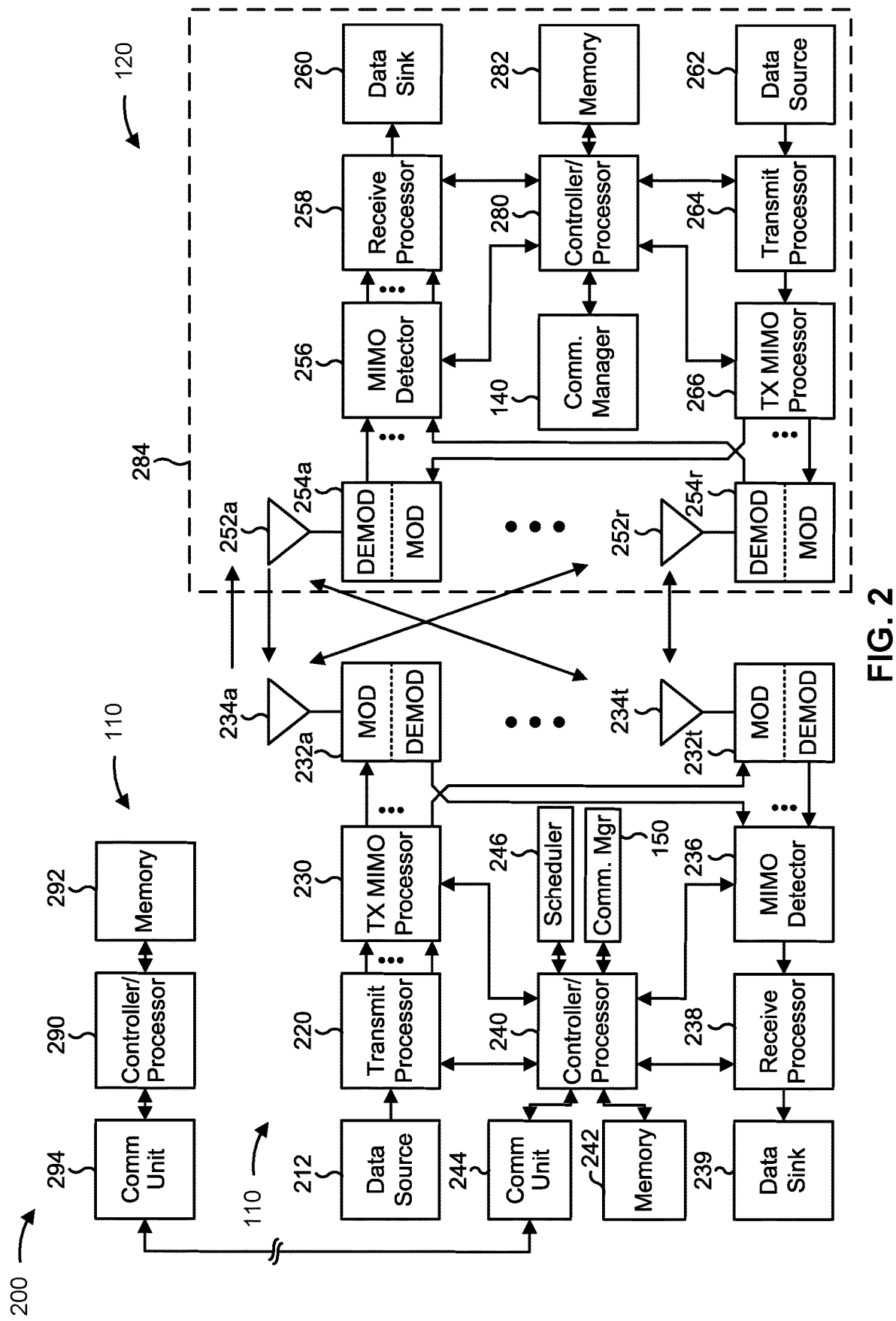
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-7).

The controller/processor 240 of the base station 110, the controller/processor 280 of the UE 120, and/or any other component(s) of FIG. 2 may perform one or more techniques associated with paging optimization for network power saving, as described in more detail elsewhere herein.

Figure 4:
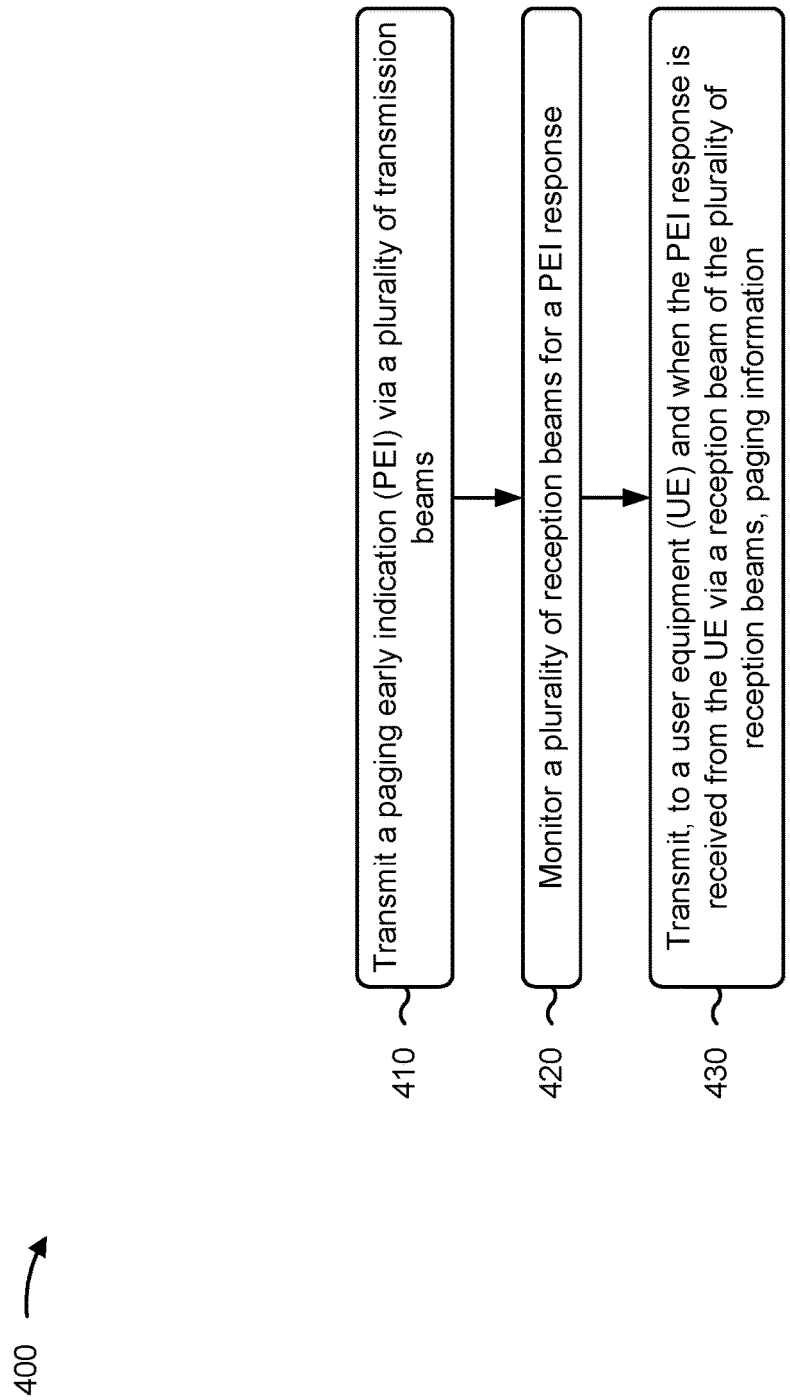
FIGS. 4 and 5 are diagrams illustrating example processes associated with paging optimization for network power saving, in accordance with the present disclosure.
Figure 5:
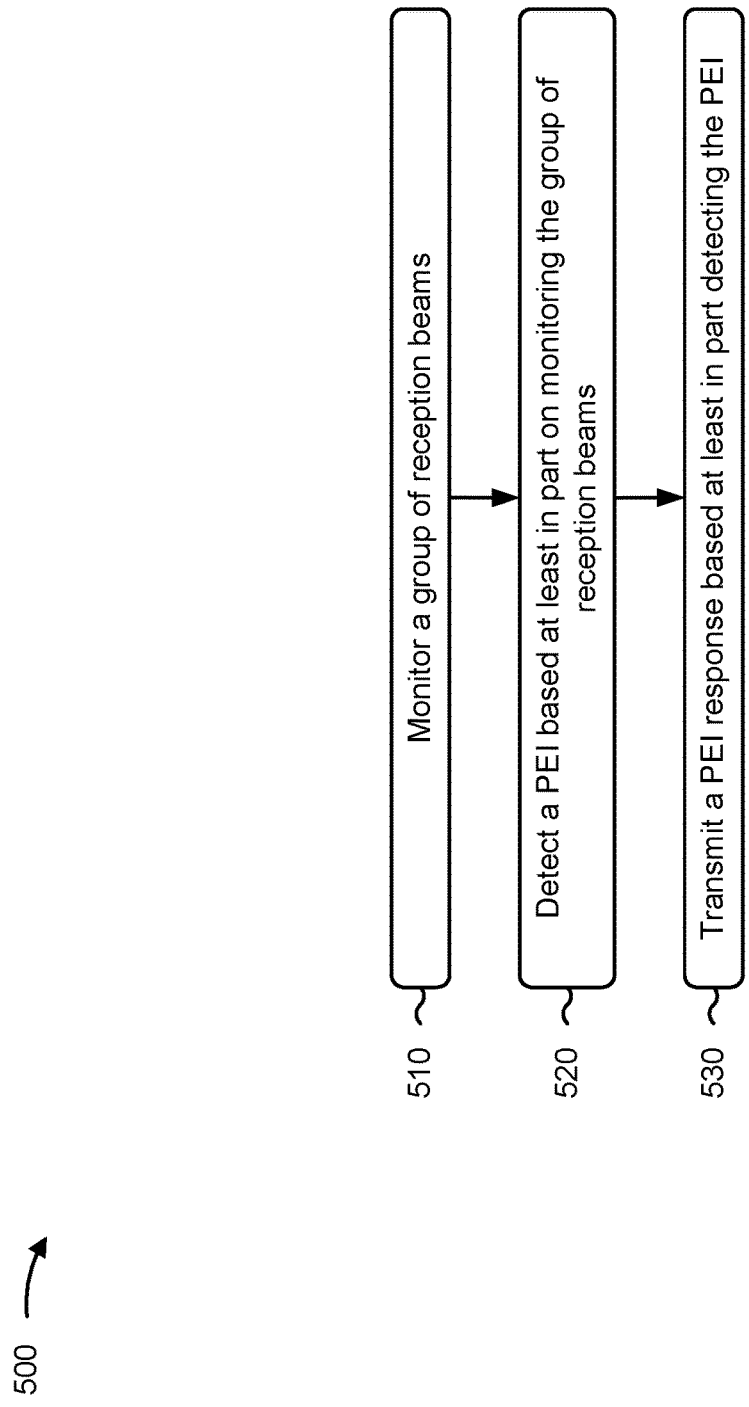

For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, the base station includes means for transmitting a paging early indication (PEI) via a plurality of transmission beams; means for monitoring a plurality of reception beams for a PEI response; and/or means for transmitting, to a UE and when the PEI response is received from the UE via a reception beam of the plurality of reception beams, paging information. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE includes means for monitoring a group of reception beams; means for detecting a PEI based at least in part on monitoring the group of reception beams; and/or means for transmitting a PEI response based at least in part detecting the PEI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a wireless communication system, a UE may, during some periods of time, not have an active connection with a base station and, therefore, may not be able to receive signaling dedicated to the UE. For example, a UE operating in a radio resource control (RRC) idle mode does not have an RRC connection with a base station and, therefore, cannot not receive dedicated signaling from the base station. Rather, the UE only receives broadcast information (e.g., synchronization signal blocks (SSBs) or system information blocks (SIBs)). One technique by which the base station can establish communication with the UE during such a period of time is through a paging procedure.

In some cases, a paging procedure may include the base station sending a paging message to the UE. The paging message may include a request to wake from the idle mode and reconnect to the network. The paging message may be transmitted in a physical downlink shared channel (PDSCH) communication (e.g., a paging PDSCH). Prior to transmitting the paging PDSCH in a paging occasion (PO), the base station may transmit, and the UE may receive, a physical downlink control channel (PDCCH) communication (e.g., a paging PDCCH) scheduling the paging PDSCH. The base station may transmit the paging PDCCH and the paging PDSCH within a PO associated with the UE. The PO may be a set of resources in which the UE is configured to check for paging messages for the UE.

In practice, when the UE wakes to monitor the PO, timing and/or frequency synchronization between the UE and the base station may be lost. Thus, to obtain reliable paging detection, the UE may perform timing/frequency tracking to regain timing/frequency synchronization. For example, the UE may be configured to receive a set of SSBs, may estimate a timing/frequency mismatch based on the set of SSBs, and may compensate for the estimated timing/frequency mismatch accordingly. Therefore, prior to a given configured PO, the UE may perform timing/frequency tracking. In some cases, the UE may also use the set of SSBs to update an automatic gain controller (AGC) of the UE. Then, at the configured PO, the UE may receive and decode the paging PDCCH. Here, if the paging PDCCH includes scheduling information for a paging PDSCH, then the UE may receive and decode the paging PDSCH.

However, such an operation may not be efficient in terms of UE resource consumption. For example, the base station may transmit only one paging PDCCH for all UEs associated with the same PO. Therefore, all UEs associated with the same PO may monitor the PO for paging PDCCH. Thus, for a given PO, all UEs configured with the PO may perform timing/frequency synchronization, after which all of the UEs may receive and decode the paging PDCCH. Here, if the paging PDCCH includes scheduling information for a paging PDSCH, then all of the UEs may receive and decode the paging PDSCH. However, not all of the UEs associated with the PO may be paged by the paging PDSCH and, therefore, UE processing resources and battery power may be utilized for UEs associated with the PO for which the paging PDSCH is not intended.

In some wireless communication systems, to improve efficiency of the paging procedure (i.e., to reduce usage of UE processing resources and battery power by UEs associated with a PO but for which the paging PDSCH is not intended), the base station may transmit a paging early indication (PEI). A PEI may be a communication transmitted prior to a PO associated with the UE. In some cases, the PEI may be also transmitted prior to a set of SSBs that would be used by the UE to perform timing/frequency synchronization. Generally, the PEI informs the UE of whether the UE should process a paging PDCCH and/or a paging PDSCH in one or more upcoming POs.

In some cases, a UE may receive a PEI indicating whether a paging PDSCH for at least one UE in a UE group (e.g., a group of UEs, including the UE, that is associated with the one or more upcoming POs) or a UE sub-group (e.g., a subset of UEs, from the group of UEs, that includes the UE) will be included in an upcoming paging occasion. If the PEI indicates that at least one UE in the UE group or the UE sub-group of the UE will be paged in the upcoming PO, then the UE may wake to perform timing/frequency synchronization, perform paging PDCCH reception and decoding, and perform paging PDSCH reception and decoding for the upcoming PO, accordingly. Conversely, if the PEI indicates that no UE in the UE group or UE sub-group will be paged in the upcoming PO, then the UE may skip timing/frequency synchronization, skip paging PDCCH reception and decoding, and skip paging PDSCH reception and decoding for the upcoming PO.

In some cases, when the UE does not have an active connection with the network (e.g., when the UE is in the idle mode), the location of the UE may be unknown to the network. Because the location of the UE is unknown to the network (e.g., because the UE does not have an active connection with the network), the network may be unable to determine which base station is able to communicate with the UE. Therefore, the network may cause the PEI, the paging PDCCH, and the paging PDSCH to be transmitted by multiple base stations and/or multiple cells.

Further, in higher frequency bands, beamforming may be used, and, because the location of the UE is unknown, each base station may be unable to determine a direction to the UE. Because each base station may be unable to determine a direction to the UE, each base station may beam sweep the PEI, the paging PDCCH, and the paging PDSCH (e.g., transmit the PEI, the paging PDCCH, and the paging PDSCH via multiple transmission beams associated with multiple, different directions). The transmission of the PEI, the paging PDCCH, and the paging PDSCH by multiple base stations and/or via multiple transmission beams may result in high levels of energy consumption by the network.

Some techniques and apparatuses described herein enable a network to determine whether a base station is able to communicate with a UE and, if so, estimate a location of and/or a direction to the UE based at least in part on configuring a UE to transmit a response to a PEI (e.g., a PEI response) to a base station from which the UE receives a PEI. In this way, the network may reduce a quantity of base stations transmitting a paging PDCCH and a paging PDSCH and/or a quantity of transmission beams on which the paging PDCCH and the PDSCH are transmitted, which may reduce the levels of energy consumption by the network.

Figure 3:
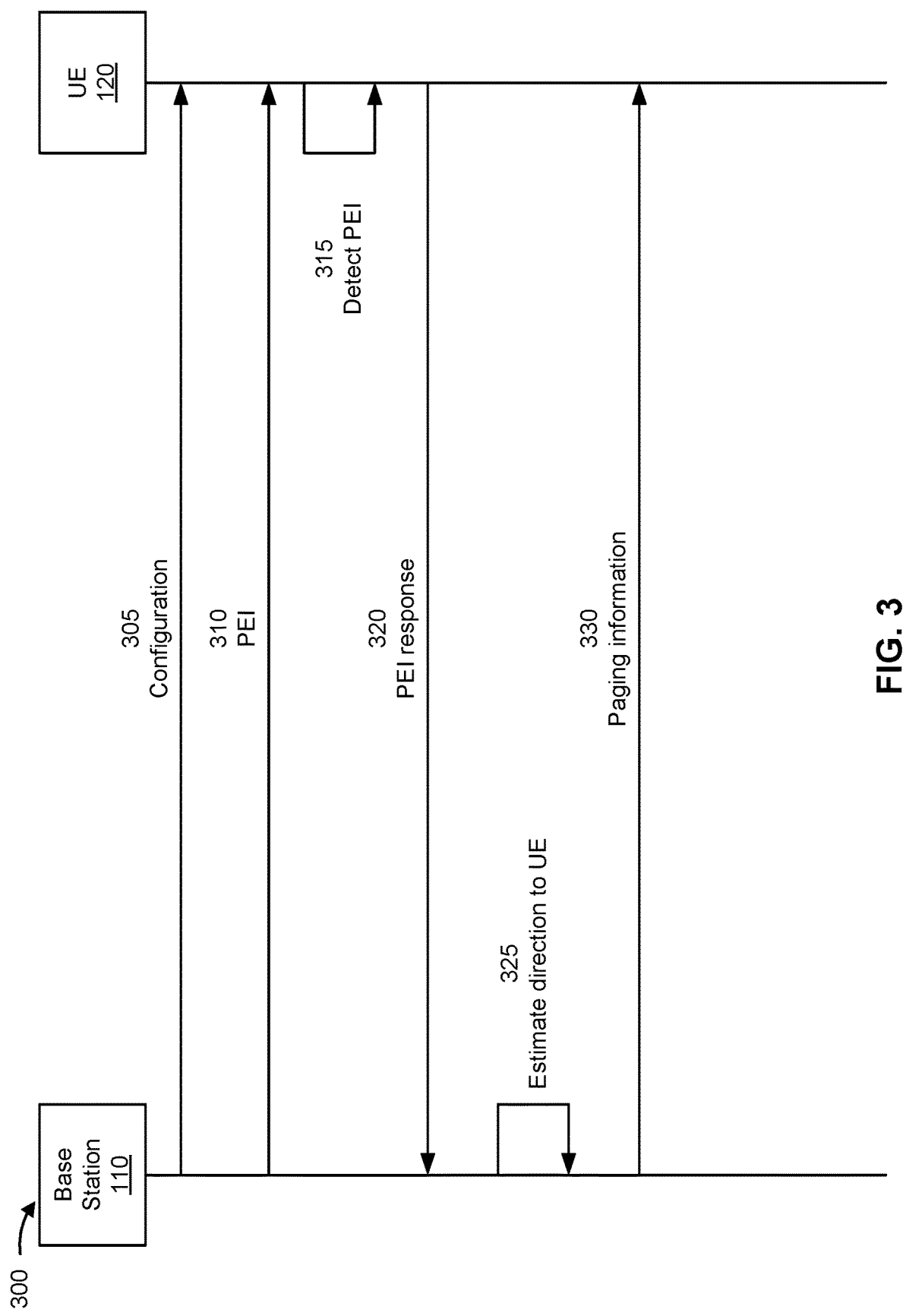
FIG. 3 is a diagram illustrating an example associated with paging optimization for network power saving, in accordance with the present disclosure.

FIG. 3 is a diagram illustrating an example 300 associated with paging optimization for network power saving, in accordance with the present disclosure. As shown in FIG. 3, example 300 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, as shown by reference number 305, the base station 110 may configure the UE 120. In some aspects, the base station 110 may configure the UE 120 to monitor one or more PEI occasions and/or one or more POs. Each PEI occasion and/or PO may be a set of resources in which the UE is configured to monitor for a PEI and/or paging information, respectively, for the UE.

As shown by reference number 310, the base station 110 may transmit a PEI via a plurality of transmission beams. In some aspects, the PEI may be transmitted to a single UE (e.g., a UE for which the base station 110 is to transmit paging information). For example, the base station 110 may transmit the PEI to the UE 120. In some aspects, the PEI may be transmitted to a group of UEs. In some aspects, the group of UEs may include the UE 120.

In some aspects, the PEI may include information identifying one or more UEs to which the PEI is transmitted. In some aspects, the base station 110 may transmit the PEI to the UE 120 and the PEI may include information identifying the UE 120.

In some aspects, the base station 110 may transmit the PEI to a group of UEs (e.g., a group of UEs that includes the UE 120) and the PEI may include information identifying the group of UEs and/or information identifying one or more UEs included in the group of UEs.

In some aspects, the PEI may indicate a set of resources for transmitting a PEI response to the PEI. In some aspects, the PEI may indicate a PEI response occasion associated with transmitting a PEI response to the PEI. In some aspects, the PEI response occasion may be indicated in a communication that is separate from the PEI. In some aspects, the base station 110 transmits, and the UE 120 receives, the communication indicating the PEI response occasion during the PEI occasion in which the PEI was detected.

In some aspects, the base station 110 may transmit, and the UE 120 may receive, an indication of a PEI response occasion and an association between the PEI response occasion and the PEI occasion. In some aspects, the UE 120 may receive the indication of the PEI response occasion and the association between the PEI response occasion and the PEI occasion during the PEI occasion associated with the UE 120 detecting the PEI. In some aspects, the indication of the PEI response occasion and the association between the PEI response occasion and the PEI occasion may be received via broadcast system information.

In some aspects, the indication of the PEI response occasion and the association between the PEI response occasion and the PEI occasion may be transmitted to the UE 120 based at least in part on the UE 120 having beam reciprocity with the base station 110. As an example, the base station 110 may configure the UE 120 to transmit a PEI response to a PEI by transmitting the indication of the PEI response occasion and the association between the PEI response occasion and the PEI occasion to the UE 120. The base station 110 may configure the UE 120 to transmit the PEI response based at least in part on the UE 120 having beam reciprocity with the base station 110. Stated differently, in some aspects, the base station 110 may not configure the UE 120 to transmit the PEI response when the UE 120 does not have beam reciprocity with the base station 110.

As shown by reference number 315, the UE 120 may detect the PEI based at least in part on monitoring a group of reception beams of the UE 120. In some aspects, the UE 120 may monitor the group of reception beams of the UE 120 during one or more PEI occasions according to the configuration received from the base station 110.

In some aspects, when the UE 120 wakes to monitor the group of reception beams, timing and/or frequency synchronization between the UE 120 and the base station 110 may be lost and the UE 120 may perform timing/frequency tracking to regain timing/frequency synchronization. For example, the UE 120 may be configured to receive a set of SSBs, may estimate a timing/frequency mismatch based on the set of SSBs, and may compensate for the estimated timing/frequency mismatch accordingly. In some aspects, receiving and/or decoding the PEI may be less complex relative to receiving and/or decoding paging information, and the UE 120 may utilize a single SSB (e.g., rather than multiple SSBs) to estimate and/or compensate for the time/frequency mismatch between the UE 120 and the base station 110.

In some aspects, the UE 120 may determine whether the PEI indicates that the UE 120 is to monitor for paging information during a PO. In some aspects, the UE 120 may determine whether the PEI indicates that the UE 120 is to monitor for paging information during a PO based at least in part on information identifying one or more UEs that is included in the PEI. For example, the UE 120 may determine that the PEI indicates that the UE 120 is to monitor for paging information during a PO based at least in part on information identifying the UE 120 being included in the PEI. As another example, the UE 120 may determine that the PEI indicates that the UE 120 is not to monitor for paging information during a PO (e.g., that the UE 120 may remain in an idle mode during the PO) based at least in part on information identifying the UE 120 being included in the PEI.

In some aspects, the PEI may be transmitted to only the UE 120 and the information identifying the UE 120 includes an identifier associated with the UE 120. For example, the information identifying the UE 120 may include an international mobile subscriber identity (IMSI) associated with the UE 120, an integrated circuit card identifier (ICCID) associated with the UE 120, or an international mobile equipment identity (IMEI) associated with the UE 120, among other examples. In some aspects, the information identifying the UE 120 may include a fixed identifier. For example, the information identifying the UE 120 may include a fixed scrambling identifier or a fixed random access channel (RACH) preamble identifier, among other examples. The UE 120 may determine that the UE 120 is to monitor for paging information during a PO based at least in part on the PEI including the identifier associated with the UE 120.

In some aspects, the PEI may be transmitted to a group of UEs and the PEI may include an identifier associated with the group of UEs. The UE 120 may determine that the UE 120 is to monitor for paging information during a PO based at least in part on the PEI including the identifier associated with the group of UEs and the UE 120 being included in the group of UEs.

In some aspects, the identifier associated with the group of UEs includes a group identifier. The group identifier may be associated with a group of UE identifiers. Each UE identifier, of the group of UE identifiers, may be associated with a respective UE of the group of UEs. The UE 120 may determine that the UE 120 is to monitor for paging information during a PO based at least in part on the PEI including the group identifier associated with the group of UEs and based at least in part on a UE identifier associated with the UE 120 being associated with the group identifier.

As shown by reference number 320, the UE 120 may transmit a PEI response based at least in part on detecting the PEI and/or the PEI indicating that the UE 120 is to monitor for the paging information. In some aspects, a format of the PEI response may be based at least in part on a RACH preamble, a physical uplink control channel (PUCCH), a physical uplink shared channel (PUSCH), or an uplink sounding reference signal, among other examples.

In some aspects, the PEI response may include information identifying the UE 120. In some aspects, the information identifying the UE 120 may include a fixed identifier. For example, the information identifying the UE 120 may include a fixed scrambling identifier or a fixed RACH preamble identifier, among other examples.

In some aspects, the information identifying the UE 120 may include an identifier associated with the UE 120. For example, the information identifying the UE 120 may include an IMSI associated with the UE 120, an ICCID associated with the UE 120, or an IMEI associated with the UE 120, among other examples. In some aspects, the information identifying the UE 120 may include a group identifier associated with a group of UEs (e.g., including the UE 120) to which the PEI was transmitted.

In some aspects, the UE 120 may transmit the PEI response during a PEI response occasion that is associated with a PEI occasion during which the PEI was received. For example, the PEI may be transmitted during a first quantity of PEI occasions during a time period. In some aspects, each PEI occasion, of the one or more PEI response occasions, may be associated with one or more PEI response occasions. The UE 120 may transmit the PEI response during a PEI response occasion associated with a PEI occasion during which the PEI was detected.

In some aspects, the first quantity of PEI occasions may be mapped to a second quantity of PEI response occasions during the time period. In some aspects, the mapping between the first quantity of PEI occasions and the second quantity of PEI response occasions may be a one-to-one mapping. For example, the first quantity may be equal to the second quantity and each PEI occasion may be mapped to a respective PEI response occasion.

In some aspects, the mapping between the first quantity of PEI occasions and the second quantity of PEI response occasions may be a one-to-many mapping. For example, the first quantity may be different from the second quantity and each PEI occasion may be mapped to multiple PEI response occasions.

In some aspects, the mapping between the first quantity of PEI occasions and the second quantity of PEI response occasions may be a one-to-many mapping based at least in part on there being no beam reciprocity between the base station 110 and the UE 120. In some aspects, the UE 120 may not have beam reciprocity with the base station 110. In some aspects, the base station 110 may not have beam reciprocity with the UE 120. The PEI occasion, during which the PEI was detected, may be mapped to multiple PEI response occasions based at least in part on the UE 120 not having beam reciprocity with the base station 110 or the base station 110 not having beam reciprocity with the UE 120. The multiple PEI response occasions may be associated with multiple transmission beams of the UE 120 and the UE 120 may transmit the PEI response via the multiple transmission beams according to the multiple PEI response occasions based at least in part on detecting the PEI during the PEI occasion.

In some aspects, the mapping between the first quantity of PEI occasions and the second quantity of PEI response occasions may be a many-to-one mapping. For example, the first quantity may be different from the second quantity and multiple PEI occasions may be mapped to a single PEI response occasion.

In some aspects, the PEI response may be transmitted via a set of resources configured by the base station 110. For example, the PEI response may be transmitted via a set of resources indicated in the PEI.

In some aspects, the PEI response may be transmitted based at least in part on a target power parameter. In some aspects, the target power parameter may correspond to a maximum transmission power. For example, the PEI response may be transmitted utilizing a maximum transmission power.

In some aspects, the target power parameter may correspond to a power-ramping configuration. For example, the UE 120 may transmit the PEI response multiple times. The UE 120 may increase the transmit power utilized to transmit the PEI response for each transmission according to the power-ramping configuration. In some aspects, the UE 120 may continue to transmit the PEI response until a maximum transmission power is reached or until the PEI response is transmitted a maximum quantity of times.

In some aspects, the base station 110 may monitor a plurality of reception beams of the base station 110 based at least in part on transmitting the PEI. For example, the base station 110 may beam sweep a plurality of reception beams to detect whether a PEI response is transmitted to the base station 110 by the UE 120. The base station 110 may monitor the plurality of reception beams for the PEI response during the one or more PEI response occasions associated with the PEI occasions during which the PEI was transmitted.

In some aspects, the base station 110 may not detect a PEI response based at least in part on monitoring the plurality of reception beams. For example, the base station 110 may transmit the PEI to a UE that is not within a coverage area of the base station 110. In these aspects, the base station 110 may determine that the UE is not within the coverage area of the base station 110 based at least in part on not detecting a PEI response during the PEI response occasions. The base station 110 may determine not to transmit paging information for the UE based at least in part on the UE not being within the coverage area of the base station 110.

In some aspects, the base station 110 may detect a PEI response based at least in part on monitoring the plurality of reception beams. For example, the base station 110 may transmit the PEI to the UE 120. The UE 120 may detect the PEI and may transmit a PEI response via one or more transmission beams of the UE 120, as described elsewhere herein. The one or more transmission beams of the UE 120 may correspond to one or more reception beams, of the plurality of reception beams of the base station 110, that are monitored by the base station 110. The base station 110 may receive the PEI response based at least in part on monitoring the one or more reception beams.

As shown by reference number 325, the base station 110 may estimate a direction associated with the UE 120 based at least in part on detecting the PEI response. In some aspects, the base station 110 may estimate the direction associated with the UE 120 based at least in part on a direction associated with a transmission beam via which the PEI was transmitted and/or a direction associated with a reception beam via which the PEI response was detected.

In some aspects, the base station 110 may determine a PEI associated with the PEI response. The base station 110 may determine a transmission beam via which the PEI was transmitted. The base station 110 may determine a transmit direction associated with the transmission beam.

In some aspects, the PEI may be transmitted during a first quantity of PEI occasions during a time period. Each PEI occasion, of the first quantity of PEI occasions, may be associated with a beam direction and/or a synchronization signal block (SSB) index. The base station 110 may determine the beam direction and/or the SSB index associated with the PEI occasion associated with the UE 120 detecting the PEI.

Similarly, in some aspects, the base station 110 may determine a reception beam via which the PEI response was received. The base station 110 may determine a reception direction associated with the reception beam. In some aspects, a PEI occasion may be associated with one or more PEI response occasions. Each PEI response occasion, of the one or more PEI response occasions, may be associated with a beam direction and/or an SSB index. The base station 110 may determine a beam direction and/or an SSB index associated with the PEI response occasion associated with the PEI response.

In some aspects, the base station 110 may estimate a direction associated with the UE 120 based at least in part on the transmit direction and/or the reception direction. For example, the base station 110 may estimate a direction to the UE 120 based on the beam direction and/or the SSB index associated with the PEI occasion, and/or the beam direction and/or the SSB index associated with the PEI response occasion.

As shown by reference number 330, the base station 110 may transmit paging information to the UE 120 based at least in part on detecting the PEI response and based at least in part on the estimated direction to the UE 120. For example, during a next PO, the base station 110 may transmit the paging information via a transmission beam of the base station 110 that is associated with the estimated direction to the UE 120.

In some aspects, the base station 110 may transmit the paging information during a single PO. In some aspects, the base station 110 may transmit the paging information during multiple POs.

The UE 120 may monitor one or more reception beams of the UE 120 during one or more POs. The UE 120 may receive and decode the paging information based at least in part on monitoring the one or more reception beams of the UE 120 during the one or more POs.

As indicated above, FIG. 3 is provided as an example. Other examples may differ from what is described with respect to FIG. 3.

FIG. 4 is a diagram illustrating an example process 400 performed, for example, by a base station, in accordance with the present disclosure. Example process 400 is an example where the base station (e.g., base station 110) performs operations associated with paging optimization for network power saving.

As shown in FIG. 4, in some aspects, process 400 may include transmitting a PEI via a plurality of transmission beams (block 410). For example, the base station (e.g., using communication manager 150 and/or transmission component 604, depicted in FIG. 6) may transmit a PEI via a plurality of transmission beams, as described above.

As further shown in FIG. 4, in some aspects, process 400 may include monitoring a plurality of reception beams for a PEI response (block 420). For example, the base station (e.g., using communication manager 150 and/or monitor component 608, depicted in FIG. 6) may monitor a plurality of reception beams for a PEI response, as described above.

As further shown in FIG. 4, in some aspects, process 400 may include transmitting, to a UE and when the PEI response is received from the UE via a reception beam of the plurality of reception beams, paging information (block 430). For example, the base station (e.g., using communication manager 150 and/or transmission component 604, depicted in FIG. 6) may transmit, to a UE and when the PEI response is received from the UE via a reception beam of the plurality of reception beams, paging information, as described above.

Process 400 may include additional aspects, such as any single aspect or any combination of aspects described below and/or in connection with one or more other processes described elsewhere herein.

In a first aspect, the paging information is not transmitted when the PEI response is not received from the UE.

In a second aspect, alone or in combination with the first aspect, the paging information is transmitted during one or more paging occasions.

In a third aspect, alone or in combination with one or more of the first and second aspects, process 400 includes estimating, based at least in part on receiving the PEI response via the reception beam, a direction associated with the UE based at least in part on a direction associated with the reception beam and a direction associated with a transmission beam, of the plurality of transmission beams, associated with the PEI transmitted to the UE, wherein the paging information is transmitted based at least in part on the direction associated with the UE.

In a fourth aspect, alone or in combination with one or more of the first through third aspects, the PEI is transmitted to a group of UEs, and the UE is included in the group of UEs.

In a fifth aspect, alone or in combination with one or more of the first through fourth aspects, the PEI is transmitted during a first quantity of PEI occasions occurring during a time period, and the first quantity of PEI occasions are mapped to a second quantity of PEI response occasions occurring during the time period.

In a sixth aspect, alone or in combination with one or more of the first through fifth aspects, the first quantity is equal to the second quantity, and there is a one-to-one mapping between the first quantity of PEI occasions and the second quantity of PEI response occasions.

In a seventh aspect, alone or in combination with one or more of the first through sixth aspects, each PEI occasion of the first quantity of PEI occasions and each PEI response occasion of the second quantity of PEI response occasions are associated with at least one of a beam direction or an SSB index.

In an eighth aspect, alone or in combination with one or more of the first through seventh aspects, the first quantity is different from the second quantity, and there is a one-to-many mapping between the first quantity of PEI occasions and the second quantity of PEI response occasions.

In a ninth aspect, alone or in combination with one or more of the first through eighth aspects, the first quantity is different from the second quantity, and there is a many-to-one mapping between the first quantity of PEI occasions and the second quantity of PEI response occasions.

In a tenth aspect, alone or in combination with one or more of the first through ninth aspects, there is a one-to-many mapping between the first quantity of PEI occasions and the second quantity of PEI response occasions based at least in part on there being no beam reciprocity between the base station and the UE.

In an eleventh aspect, alone or in combination with one or more of the first through tenth aspects, the UE does not have beam reciprocity with the base station, wherein each PEI occasion, of the first quantity of PEI occasions, is mapped to multiple PEI response occasions, of the second quantity of PEI response occasions, and wherein the multiple PEI response occasions are associated with multiple transmission beams of the UE.

In a twelfth aspect, alone or in combination with one or more of the first through eleventh aspects, the base station does not have beam reciprocity with the UE, wherein each PEI occasion, of the first quantity of PEI occasions, is mapped to multiple PEI response occasions, of the second quantity of PEI response occasions, and wherein the multiple PEI response occasions are associated with multiple reception beams, of the plurality of reception beams.

In a thirteenth aspect, alone or in combination with one or more of the first through twelfth aspects, process 400 includes transmitting an indication of a PEI response occasion and an association between the PEI response occasion and a PEI occasion, wherein the PEI is transmitted during the PEI occasion and the PEI response is received during the PEI response occasion.

In a fourteenth aspect, alone or in combination with one or more of the first through thirteenth aspects, the indication of the PEI response occasion and the association between the PEI response occasion and the PEI occasion is transmitted via broadcast system information.

In a fifteenth aspect, alone or in combination with one or more of the first through fourteenth aspects, the indication of the PEI response occasion and the association between the PEI response occasion and the PEI occasion is transmitted to the UE based at least in part on the UE having beam reciprocity with the base station.

In a sixteenth aspect, alone or in combination with one or more of the first through fifteenth aspects, when the PEI response is received from the UE, the PEI response includes information identifying the UE, and the paging information is transmitted to the UE based at least in part on the information identifying the UE.

In a seventeenth aspect, alone or in combination with one or more of the first through sixteenth aspects, the information identifying the UE is based at least in part on a fixed identifier associated with the UE.

In an eighteenth aspect, alone or in combination with one or more of the first through seventeenth aspects, the fixed identifier is a fixed scrambling identifier or a fixed RACH preamble identifier.

In a nineteenth aspect, alone or in combination with one or more of the first through eighteenth aspects, the information identifying the UE is based at least in part on an identifier of the UE.

In a twentieth aspect, alone or in combination with one or more of the first through nineteenth aspects, the PEI is transmitted to a group of UEs that includes the UE, wherein each UE, of the group of UEs, is associated with a group of identifiers, and wherein the PEI indicates an identifier, of the group of identifiers, associated with the UE.

In a twenty-first aspect, alone or in combination with one or more of the first through twentieth aspects, a format of the PEI response is based at least in part on a RACH preamble, a PUCCH, a PUSCH, or an uplink sounding reference signal.

In a twenty-second aspect, alone or in combination with one or more of the first through twenty-first aspects, the PEI indicates a set of resources for transmitting the PEI response.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a UE, in accordance with the present disclosure. Example process 500 is an example where the UE (e.g., UE 120) performs operations associated with paging optimization for network power saving.

As shown in FIG. 5, in some aspects, process 500 may include monitoring a group of reception beams (block 510). For example, the UE (e.g., using communication manager 140 and/or monitor component 708, depicted in FIG. 7) may monitor a group of reception beams, as described above.

As further shown in FIG. 5, in some aspects, process 500 may include detecting a PEI based at least in part on monitoring the group of reception beams (block 520). For example, the UE (e.g., using communication manager 140 and/or detection component 710, depicted in FIG. 7) may detect a PEI based at least in part on monitoring the group of reception beams, as described above.

As further shown in FIG. 5, in some aspects, process 500 may include transmitting a PEI response based at least in part detecting the PEI (block 530). For example, the UE (e.g., using communication manager 140 and/or transmission component 704, depicted in FIG. 7) may transmit a PEI response based at least in part detecting the PEI, as described above.

Process 500 may include additional aspects, such as any single aspect or any combination of aspects described below and/or in connection with one or more other processes described elsewhere herein.

In a first aspect, process 500 includes monitoring, on a paging occasion associated with the PEI, for paging information.

In a second aspect, alone or in combination with the first aspect, the PEI is transmitted to a group of UEs, and the UE is included in the group of UEs.

In a third aspect, alone or in combination with one or more of the first and second aspects, the PEI is transmitted during a first quantity of PEI occasions occurring during a time period, and the first quantity of PEI occasions are mapped to a second quantity of PEI response occasions occurring during the time period.

In a fourth aspect, alone or in combination with one or more of the first through third aspects, the first quantity is equal to the second quantity, and there is a one-to-one mapping between the first quantity of PEI occasions and the second quantity of PEI response occasions.

In a fifth aspect, alone or in combination with one or more of the first through fourth aspects, each PEI occasion of the first quantity of PEI occasions and each PEI response occasion of the second quantity of PEI response occasions are associated with at least one of a beam direction or an SSB index.

In a sixth aspect, alone or in combination with one or more of the first through fifth aspects, the first quantity is different from the second quantity, and there is a one-to-many mapping between the first quantity of PEI occasions and the second quantity of PEI response occasions.

In a seventh aspect, alone or in combination with one or more of the first through sixth aspects, the first quantity is different from the second quantity, and there is a many-to-one mapping between the first quantity of PEI occasions and the second quantity of PEI response occasions.

In an eighth aspect, alone or in combination with one or more of the first through seventh aspects, there is a one-to-many mapping between the first quantity of PEI occasions and the second quantity of PEI response occasions based at least in part on there being no beam reciprocity between a base station to which the PEI response is transmitted and the UE.

In a ninth aspect, alone or in combination with one or more of the first through eighth aspects, the UE does not have beam reciprocity with a base station to which the PEI response is transmitted, wherein a PEI occasion, of the first quantity of PEI occasions, is mapped to multiple PEI response occasions, of the second quantity of PEI response occasions, wherein the multiple PEI response occasions are associated with multiple transmission beams of the UE, and wherein transmitting the PEI response includes transmitting the PEI response via the multiple transmission beams according to the multiple PEI response occasions based at least in part on detecting the PEI during the PEI occasion.

In a tenth aspect, alone or in combination with one or more of the first through ninth aspects, a base station to which the PEI response is transmitted does not have beam reciprocity with the UE, wherein a PEI occasion, of the first quantity of PEI occasions, is mapped to multiple PEI response occasions, of the second quantity of PEI response occasions, wherein the multiple PEI response occasions are associated with multiple transmission beams of the UE, and wherein transmitting the PEI response includes transmitting the PEI response via the multiple transmission beams according to the multiple PEI response occasions based at least in part on detecting the PEI during the PEI occasion.

In an eleventh aspect, alone or in combination with one or more of the first through tenth aspects, process 500 includes receiving an indication of a PEI response occasion and an association between the PEI response occasion and a PEI occasion, wherein the PEI is received during the PEI occasion and the PEI response is transmitted during the PEI response occasion.

In a twelfth aspect, alone or in combination with one or more of the first through eleventh aspects, the indication of the PEI response occasion and the association between the PEI response occasion and the PEI occasion is received via broadcast system information.

In a thirteenth aspect, alone or in combination with one or more of the first through twelfth aspects, the indication of the PEI response occasion and the association between the PEI response occasion and the PEI occasion is received by the UE based at least in part on the UE having beam reciprocity with a base station to which the PEI response is transmitted.

In a fourteenth aspect, alone or in combination with one or more of the first through thirteenth aspects, the PEI response includes information identifying the UE, and process 500 includes receiving paging information based at least in part on the information identifying the UE.

In a fifteenth aspect, alone or in combination with one or more of the first through fourteenth aspects, the information identifying the UE is based at least in part on a fixed identifier associated with the UE.

In a sixteenth aspect, alone or in combination with one or more of the first through fifteenth aspects, the fixed identifier is a fixed scrambling identifier or a fixed RACH preamble identifier.

In a seventeenth aspect, alone or in combination with one or more of the first through sixteenth aspects, the information identifying the UE is based at least in part on an identifier of the UE.

In an eighteenth aspect, alone or in combination with one or more of the first through seventeenth aspects, the PEI is transmitted to a group of UEs that includes the UE, wherein each UE, of the group of UEs, is associated with a group of identifiers, and wherein the PEI indicates an identifier, of the group of identifiers, associated with the UE.

In a nineteenth aspect, alone or in combination with one or more of the first through eighteenth aspects, a format of the PEI response is based at least in part on a RACH preamble, a PUCCH, a PUSCH, or an uplink sounding reference signal.

In a twentieth aspect, alone or in combination with one or more of the first through nineteenth aspects, the PEI response is transmitted based at least in part on a target power parameter.

In a twenty-first aspect, alone or in combination with one or more of the first through twentieth aspects, the PEI response is transmitted utilizing a maximum transmission power.

In a twenty-second aspect, alone or in combination with one or more of the first through twenty-first aspects, the PEI response is transmitted multiple times according to a power-ramping configuration.

In a twenty-third aspect, alone or in combination with one or more of the first through twenty-second aspects, the power-ramping configuration includes increasing a transmit power by a configured value up to a maximum transmission power value or until the PEI response is transmitted a maximum quantity of times.

In a twenty-fourth aspect, alone or in combination with one or more of the first through twenty-third aspects, the PEI indicates a set of resources for transmitting the PEI response.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
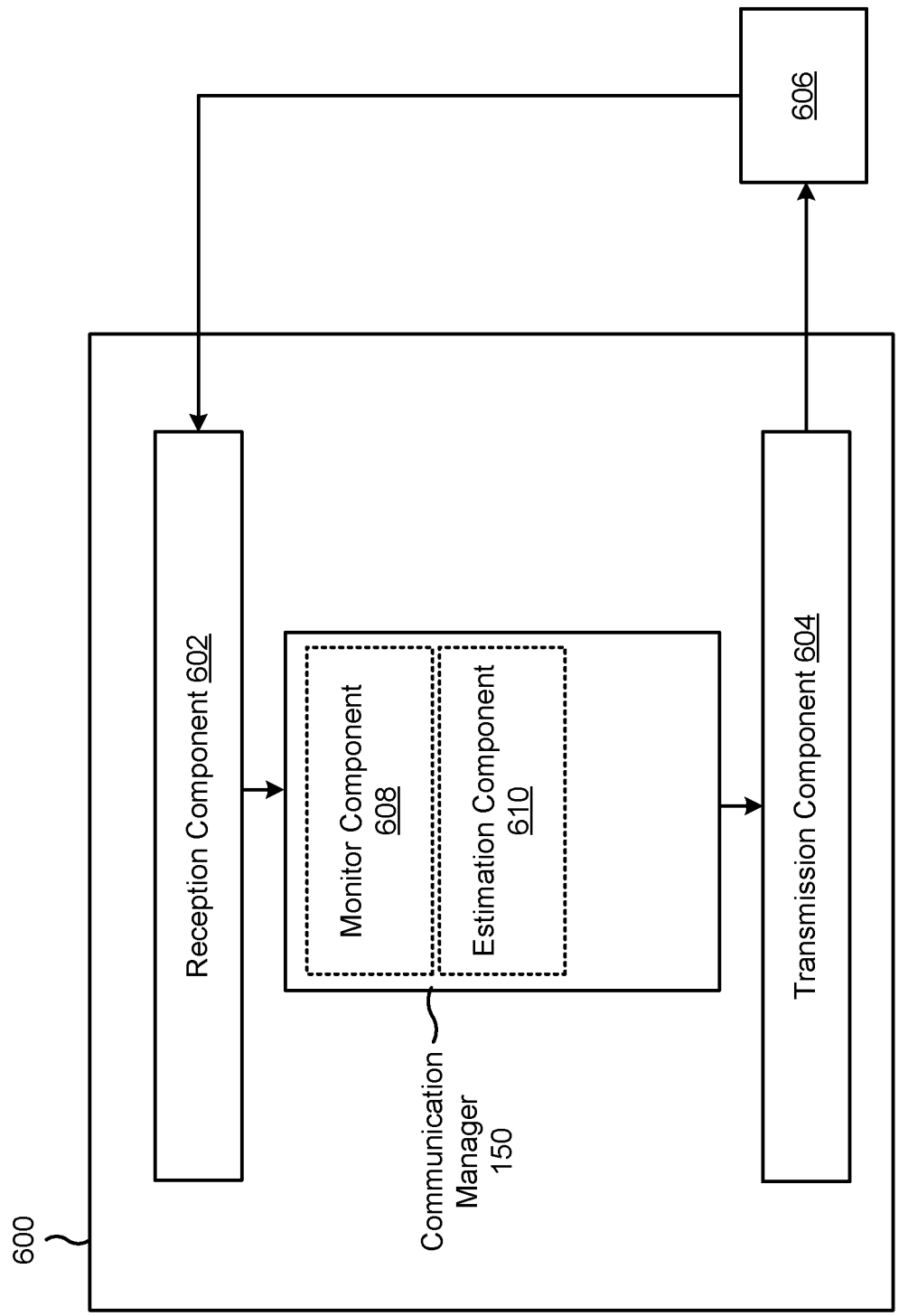
FIGS. 6 and 7 are diagrams of example apparatuses for wireless communication, in accordance with the present disclosure.

FIG. 6 is a diagram of an example apparatus 600 for wireless communication. The apparatus 600 may be a base station, or a base station may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 150. The communication manager 150 may include one or more of a monitor component 608 or an estimation component 610, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the base station described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the base station described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the base station described in connection with FIG. 2. In some aspects, the transmission component 604 may be co-located with the reception component 602 in a transceiver.

The transmission component 604 may transmit a PEI via a plurality of transmission beams. The monitor component 608 may monitor a plurality of reception beams for a PEI response. The transmission component 604 may transmit, to a UE and when the PEI response is received from the UE via a reception beam of the plurality of reception beams, paging information.

The estimation component 610 may estimate, based at least in part on receiving the PEI response via the reception beam, a direction associated with the UE based at least in part on a direction associated with the reception beam and a direction associated with a transmission beam, of the plurality of transmission beams, associated with the PEI transmitted to the UE, wherein the paging information is transmitted based at least in part on the direction associated with the UE.

The transmission component 604 may transmit an indication of a PEI response occasion and an association between the PEI response occasion and a PEI occasion, wherein the PEI is transmitted during the PEI occasion and the PEI response is received during the PEI response occasion.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
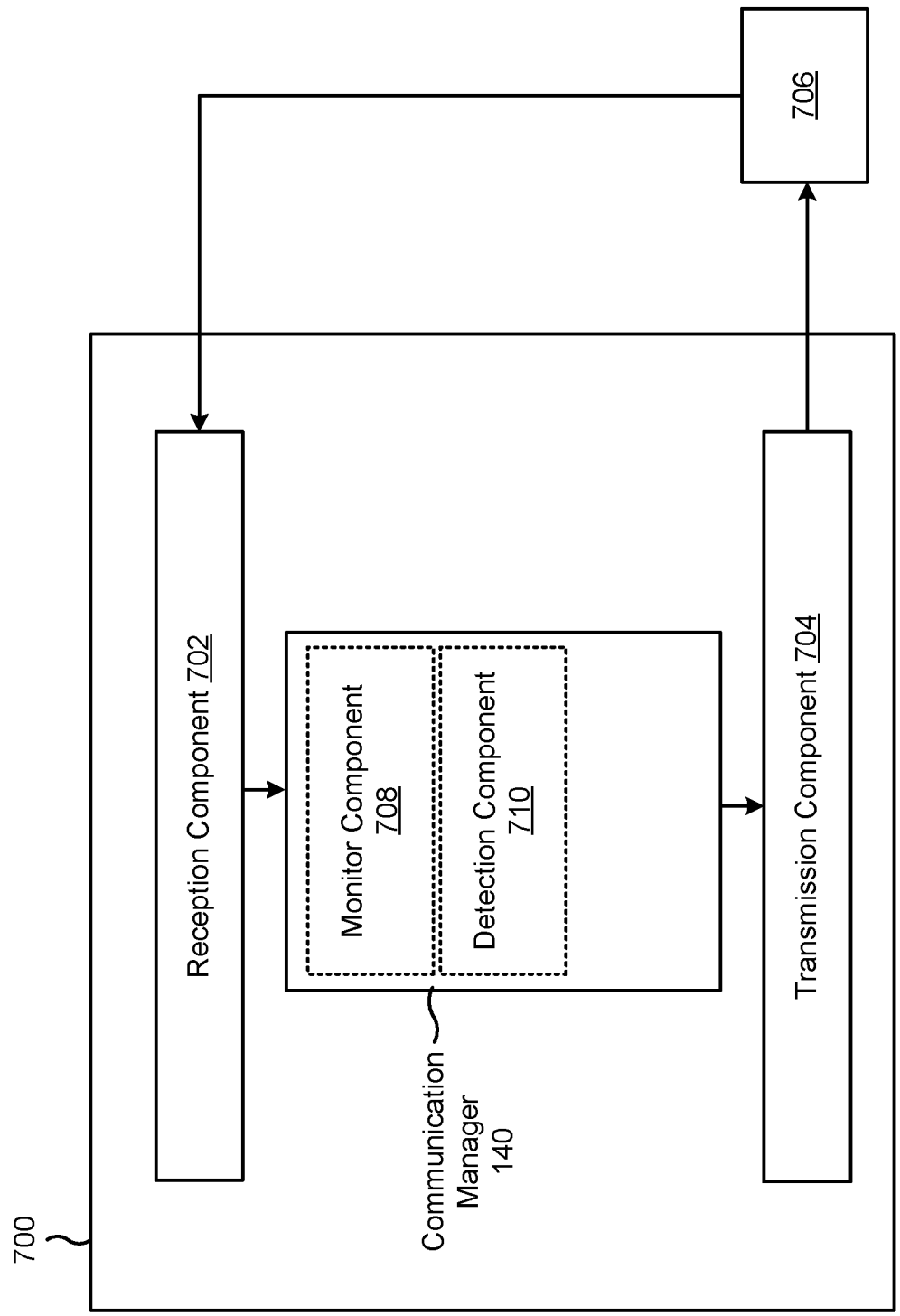

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a monitor component 708 or a detection component 710, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The monitoring component 708 may monitor a group of reception beams. The detection component 710 may detect a PEI based at least in part on monitoring the group of reception beams. The transmission component 704 may transmit a PEI response based at least in part detecting the PEI.

The monitoring component 708 may monitor, on a paging occasion associated with the PEI, for paging information.

The reception component 702 may receive an indication of a PEI response occasion and an association between the PEI response occasion and a PEI occasion, wherein the PEI is received during the PEI occasion and the PEI response is transmitted during the PEI response occasion.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a base station, comprising: transmitting a PEI via a plurality of transmission beams; monitoring a plurality of reception beams for a PEI response; and transmitting, to a UE and when the PEI response is received from the UE via a reception beam of the plurality of reception beams, paging information.

Aspect 2: The method of Aspect 1, wherein the paging information is not transmitted when the PEI response is not received from the UE.

Aspect 3: The method of one or more of Aspects 1 and 2, wherein the paging information is transmitted during one or more paging occasions.

Aspect 4: The method of one or more of Aspects 1 through 3, further comprising: estimating, based at least in part on receiving the PEI response via the reception beam, a direction associated with the UE based at least in part on a direction associated with the reception beam and a direction associated with a transmission beam, of the plurality of transmission beams, associated with the PEI transmitted to the UE, wherein the paging information is transmitted based at least in part on the direction associated with the UE.

Aspect 5: The method of one or more of Aspects 1 through 4, wherein the PEI is transmitted to a group of UEs, and wherein the UE is included in the group of UEs.

Aspect 6: The method of one or more of Aspects 1 through 5, wherein the PEI is transmitted during a first quantity of PEI occasions occurring during a time period, and wherein the first quantity of PEI occasions are mapped to a second quantity of PEI response occasions occurring during the time period.

Aspect 7: The method of Aspect 6, wherein the first quantity is equal to the second quantity, and wherein there is a one-to-one mapping between the first quantity of PEI occasions and the second quantity of PEI response occasions.

Aspect 8: The method of Aspect 6, wherein each PEI occasion of the first quantity of PEI occasions and each PEI response occasion of the second quantity of PEI response occasions are associated with at least one of a beam direction or an SSB index.

Aspect 9: The method of Aspect 6, wherein the first quantity is different from the second quantity, and wherein there is a one-to-many mapping between the first quantity of PEI occasions and the second quantity of PEI response occasions.

Aspect 10: The method of Aspect 6, wherein the first quantity is different from the second quantity, and wherein there is a many-to-one mapping between the first quantity of PEI occasions and the second quantity of PEI response occasions.

Aspect 11: The method of Aspect 6, wherein there is a one-to-many mapping between the first quantity of PEI occasions and the second quantity of PEI response occasions based at least in part on there being no beam reciprocity between the base station and the UE.

Aspect 12: The method of Aspect 6, wherein the UE does not have beam reciprocity with the base station; wherein each PEI occasion, of the first quantity of PEI occasions, is mapped to multiple PEI response occasions, of the second quantity of PEI response occasions; and wherein the multiple PEI response occasions are associated with multiple transmission beams of the UE.

Aspect 13: The method of Aspect 6, wherein the base station does not have beam reciprocity with the UE; wherein each PEI occasion, of the first quantity of PEI occasions, is mapped to multiple PEI response occasions, of the second quantity of PEI response occasions; and wherein the multiple PEI response occasions are associated with multiple reception beams, of the plurality of reception beams.

Aspect 14: The method of one or more of Aspects 1 through 13, further comprising: transmitting an indication of a PEI response occasion and an association between the PEI response occasion and a PEI occasion, wherein the PEI is transmitted during the PEI occasion and the PEI response is received during the PEI response occasion.

Aspect 15: The method of Aspect 13, wherein the indication of the PEI response occasion and the association between the PEI response occasion and the PEI occasion is transmitted via broadcast system information.

Aspect 16: The method of Aspect 13, wherein the indication of the PEI response occasion and the association between the PEI response occasion and the PEI occasion is transmitted to the UE based at least in part on the UE having beam reciprocity with the base station.

Aspect 17: The method of one or more of Aspects 1 through 16, wherein, when the PEI response is received from the UE, the PEI response includes information identifying the UE, and the paging information is transmitted to the UE based at least in part on the information identifying the UE.

Aspect 18: The method of Aspect 16, wherein the information identifying the UE is based at least in part on a fixed identifier associated with the UE.

Aspect 19: The method of Aspect 17, wherein the fixed identifier is a fixed scrambling identifier or a fixed RACH preamble identifier.

Aspect 20: The method of Aspect 16, wherein the information identifying the UE is based at least in part on an identifier of the UE.

Aspect 21: The method of one or more of Aspects 1 through 20, wherein the PEI is transmitted to a group of UEs that includes the UE, wherein each UE, of the group of UEs, is associated with a group of identifiers, and wherein the PEI indicates an identifier, of the group of identifiers, associated with the UE.

Aspect 22: The method of one or more of Aspects 1 through 21, wherein a format of the PEI response is based at least in part on a RACH preamble, a PUCCH, a PUSCH, or an uplink sounding reference signal.

Aspect 23: The method of one or more of Aspects 1 through 22, wherein the PEI indicates a set of resources for transmitting the PEI response.

Aspect 24: A method of wireless communication performed by a UE, comprising: monitoring a group of reception beams; detecting a PEI based at least in part on monitoring the group of reception beams; and transmitting a PEI response based at least in part detecting the PEI.

Aspect 25: The method of Aspect 24, further comprising: monitoring, on a paging occasion associated with the PEI, for paging information.

Aspect 26: The method of one or more of Aspects 24 and 25, wherein the PEI is transmitted to a group of UEs, and wherein the UE is included in the group of UEs.

Aspect 27: The method of one or more of Aspects 24 through 26, wherein the PEI is transmitted during a first quantity of PEI occasions occurring during a time period, and wherein the first quantity of PEI occasions are mapped to a second quantity of PEI response occasions occurring during the time period.

Aspect 28: The method of Aspect 27, wherein the first quantity is equal to the second quantity, and wherein there is a one-to-one mapping between the first quantity of PEI occasions and the second quantity of PEI response occasions.

Aspect 29: The method of Aspect 27, wherein each PEI occasion of the first quantity of PEI occasions and each PEI response occasion of the second quantity of PEI response occasions are associated with at least one of a beam direction or an SSB index.

Aspect 30: The method of Aspect 27, wherein the first quantity is different from the second quantity, and wherein there is a one-to-many mapping between the first quantity of PEI occasions and the second quantity of PEI response occasions.

Aspect 31: The method of Aspect 27, wherein the first quantity is different from the second quantity, and wherein there is a many-to-one mapping between the first quantity of PEI occasions and the second quantity of PEI response occasions.

Aspect 32: The method of Aspect 27, wherein there is a one-to-many mapping between the first quantity of PEI occasions and the second quantity of PEI response occasions based at least in part on there being no beam reciprocity between a base station to which the PEI response is transmitted and the UE.

Aspect 33: The method of Aspect 27, wherein the UE does not have beam reciprocity with a base station to which the PEI response is transmitted; wherein a PEI occasion, of the first quantity of PEI occasions, is mapped to multiple PEI response occasions, of the second quantity of PEI response occasions; wherein the multiple PEI response occasions are associated with multiple transmission beams of the UE, and wherein transmitting the PEI response includes: transmitting the PEI response via the multiple transmission beams according to the multiple PEI response occasions based at least in part on detecting the PEI during the PEI occasion.

Aspect 34: The method of Aspect 27, wherein a base station to which the PEI response is transmitted does not have beam reciprocity with the UE; wherein a PEI occasion, of the first quantity of PEI occasions, is mapped to multiple PEI response occasions, of the second quantity of PEI response occasions; wherein the multiple PEI response occasions are associated with multiple transmission beams of the UE, and wherein transmitting the PEI response includes: transmitting the PEI response via the multiple transmission beams according to the multiple PEI response occasions based at least in part on detecting the PEI during the PEI occasion.

Aspect 35: The method of one or more of Aspects 24 through 34, further comprising: receiving an indication of a PEI response occasion and an association between the PEI response occasion and a PEI occasion, wherein the PEI is received during the PEI occasion and the PEI response is transmitted during the PEI response occasion.

Aspect 36: The method of Aspect 35, wherein the indication of the PEI response occasion and the association between the PEI response occasion and the PEI occasion is received via broadcast system information.

Aspect 37: The method of Aspect 35, wherein the indication of the PEI response occasion and the association between the PEI response occasion and the PEI occasion is received by the UE based at least in part on the UE having beam reciprocity with a base station to which the PEI response is transmitted.

Aspect 38: The method of one or more of Aspects 24 through 37, wherein the PEI response includes information identifying the UE, the method further comprising: receiving paging information based at least in part on the information identifying the UE.

Aspect 39: The method of Aspect 38, wherein the information identifying the UE is based at least in part on a fixed identifier associated with the UE.

Aspect 40: The method of Aspect 39, wherein the fixed identifier is a fixed scrambling identifier or a fixed RACH preamble identifier.

Aspect 41: The method of Aspect 38, wherein the information identifying the UE is based at least in part on an identifier of the UE.

Aspect 42: The method of one or more of Aspects 24 through 41, wherein the PEI is transmitted to a group of UEs that includes the UE, wherein each UE, of the group of UEs, is associated with a group of identifiers, and wherein the PEI indicates an identifier, of the group of identifiers, associated with the UE.

Aspect 43: The method of one or more of Aspects 24 through 42, wherein a format of the PEI response is based at least in part on a RACH preamble, a PUCCH, a PUSCH, or an uplink sounding reference signal.

Aspect 44: The method of one or more of Aspects 24 through 43, wherein the PEI response is transmitted based at least in part on a target power parameter.

Aspect 45: The method of one or more of Aspects 24 through 44, wherein the PEI response is transmitted utilizing a maximum transmission power.

Aspect 46: The method of one or more of Aspects 24 through 45, wherein the PEI response is transmitted utilizing a maximum transmission power.

Aspect 47: The method of one or more of Aspects 24 through 46, wherein the PEI response is transmitted multiple times according to a power-ramping configuration.

Aspect 48: The method of Aspect 47, wherein the power-ramping configuration includes increasing a transmit power by a configured value up to a maximum transmission power value or until the PEI response is transmitted a maximum quantity of times.

Aspect 49: The method of one or more of Aspects 24 through 48, wherein the PEI indicates a set of resources for transmitting the PEI response.

Aspect 50: An apparatus for wireless communication at a device, comprising a processor; memory coupled with the processor; and instructions stored in the memory and executable by the processor to cause the apparatus to perform the method of one or more of Aspects 1 through 23.

Aspect 51: A device for wireless communication, comprising a memory and one or more processors coupled to the memory, the one or more processors configured to perform the method of one or more of Aspects 1 through 23.

Aspect 52: An apparatus for wireless communication, comprising at least one means for performing the method of one or more of Aspects 1 through 23.

Aspect 53: A non-transitory computer-readable medium storing code for wireless communication, the code comprising instructions executable by a processor to perform the method of one or more of Aspects 1 through 23.

Aspect 54: A non-transitory computer-readable medium storing a set of instructions for wireless communication, the set of instructions comprising one or more instructions that, when executed by one or more processors of a device, cause the device to perform the method of one or more of Aspects 1 through 23.

Aspect 55: An apparatus for wireless communication at a device, comprising a processor; memory coupled with the processor; and instructions stored in the memory and executable by the processor to cause the apparatus to perform the method of one or more of Aspects 24 through 49.

Aspect 56: A device for wireless communication, comprising a memory and one or more processors coupled to the memory, the one or more processors configured to perform the method of one or more of Aspects 24 through 49.

Aspect 57: An apparatus for wireless communication, comprising at least one means for performing the method of one or more of Aspects 24 through 49.

Aspect 58: A non-transitory computer-readable medium storing code for wireless communication, the code comprising instructions executable by a processor to perform the method of one or more of Aspects 24 through 49.

Aspect 59: A non-transitory computer-readable medium storing a set of instructions for wireless communication, the set of instructions comprising one or more instructions that, when executed by one or more processors of a device, cause the device to perform the method of one or more of Aspects 24 through 49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of a list of" items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station for wireless communication, comprising:
   a memory; and
   one or more processors, coupled to the memory, configured to:
   transmit a paging early indication (PEI) via a plurality of transmission beams;
   monitor a plurality of reception beams for a PEI response; and
   transmit, to a user equipment (UE) and when the PEI response is received from the UE via a reception beam of the plurality of reception beams, paging information.

2. The base station of claim 1, wherein the paging information is not transmitted when the PEI response is not received from the UE.

3. The base station of claim 1, wherein the paging information is transmitted during one or more paging occasions.

4. The base station of claim 1, wherein the one or more processors are further configured to:
   estimate, based at least in part on receiving the PEI response via the reception beam, a direction associated with the UE based at least in part on a direction associated with the reception beam and a direction associated with a transmission beam, of the plurality of transmission beams, associated with the PEI transmitted to the UE, wherein the paging information is transmitted based at least in part on the direction associated with the UE.

5. The base station of claim 1, wherein the PEI is transmitted to a group of UEs, and wherein the UE is included in the group of UEs.

6. The base station of claim 1, wherein the PEI is transmitted during a first quantity of PEI occasions occurring during a time period, and wherein the first quantity of PEI occasions are mapped to a second quantity of PEI response occasions occurring during the time period.

7. The base station of claim 6, wherein the first quantity is equal to the second quantity, and wherein there is a one-to-one mapping between the first quantity of PEI occasions and the second quantity of PEI response occasions.

8. The base station of claim 6, wherein each PEI occasion of the first quantity of PEI occasions and each PEI response occasion of the second quantity of PEI response occasions are associated with at least one of a beam direction or a synchronization signal block (SSB) index.

9. The base station of claim 6, wherein the first quantity is different from the second quantity, and wherein there is a one-to-many mapping between the first quantity of PEI occasions and the second quantity of PEI response occasions.

10. The base station of claim 6, wherein the first quantity is different from the second quantity, and wherein there is a many-to-one mapping between the first quantity of PEI occasions and the second quantity of PEI response occasions.

11. The base station of claim 6, wherein there is a one-to-many mapping between the first quantity of PEI occasions and the second quantity of PEI response occasions based at least in part on there being no beam reciprocity between the base station and the UE.

12. The base station of claim 6, wherein the UE does not have beam reciprocity with the base station; wherein each PEI occasion, of the first quantity of PEI occasions, is mapped to multiple PEI response occasions, of the second quantity of PEI response occasions; and wherein the multiple PEI response occasions are associated with multiple transmission beams of the UE.

13. The base station of claim 6, wherein the base station does not have beam reciprocity with the UE; wherein each PEI occasion, of the first quantity of PEI occasions, is mapped to multiple PEI response occasions, of the second quantity of PEI response occasions; and wherein the multiple PEI response occasions are associated with multiple reception beams, of the plurality of reception beams.

14. The base station of claim 1, wherein the one or more processors are further configured to:
   transmit an indication of a PEI response occasion and an association between the PEI response occasion and a PEI occasion, wherein the PEI is transmitted during the PEI occasion and the PEI response is received during the PEI response occasion.

15. The base station of claim 14, wherein the indication of the PEI response occasion and the association between the PEI response occasion and the PEI occasion is transmitted via broadcast system information.

16. The base station of claim 14, wherein the indication of the PEI response occasion and the association between the PEI response occasion and the PEI occasion is transmitted to the UE based at least in part on the UE having beam reciprocity with the base station.

17. The base station of claim 1, wherein, when the PEI response is received from the UE, the PEI response includes information identifying the UE, and the paging information is transmitted to the UE based at least in part on the information identifying the UE.

18. The base station of claim 17, wherein the information identifying the UE is based at least in part on a fixed identifier associated with the UE.

19. The base station of claim 18, wherein the fixed identifier is a fixed scrambling identifier or a fixed random access channel (RACH) preamble identifier.

20. The base station of claim 1, wherein the PEI is transmitted to a group of UEs that includes the UE, wherein each UE, of the group of UEs, is associated with a group of identifiers, and wherein the PEI indicates an identifier, of the group of identifiers, associated with the UE.

21. The base station of claim 1, wherein a format of the PEI response is based at least in part on a random access channel (RACH) preamble, a physical uplink control channel (PUCCH), a physical uplink shared channel (PUSCH), or an uplink sounding reference signal.

22. The base station of claim 1, wherein the PEI indicates a set of resources for transmitting the PEI response.

23. A user equipment (UE) for wireless communication, comprising:
   a memory; and
   one or more processors, coupled to the memory, configured to:
      monitor a group of reception beams;
      detect a paging early indication (PEI) based at least in part on monitoring the group of reception beams; and
      transmit a PEI response based at least in part detecting the PEI.

24. The UE of claim 23, wherein the one or more processors are further configured to:
   monitor, on a paging occasion associated with the PEI, for paging information.

25. The UE of claim 23, wherein the PEI is transmitted during a first quantity of PEI occasions occurring during a time period, and wherein the first quantity of PEI occasions are mapped to a second quantity of PEI response occasions occurring during the time period.

26. The UE of claim 25, wherein the first quantity is equal to the second quantity, and wherein there is a one-to-one mapping between the first quantity of PEI occasions and the second quantity of PEI response occasions.

27. The UE of claim 25, wherein the first quantity is different from the second quantity, and wherein there is a one-to-many mapping between the first quantity of PEI occasions and the second quantity of PEI response occasions or a many-to-one mapping between the first quantity of PEI occasions and the second quantity of PEI response occasions.

28. The UE of claim 25, wherein the UE does not have beam reciprocity with a base station to which the PEI response is transmitted; wherein a PEI occasion, of the first quantity of PEI occasions, is mapped to multiple PEI response occasions, of the second quantity of PEI response occasions; wherein the multiple PEI response occasions are associated with multiple transmission beams of the UE, and wherein the one or more processors, to transmit the PEI response, are configured to:

transmit the PEI response via the multiple transmission beams according to the multiple PEI response occasions based at least in part on detecting the PEI during the PEI occasion.

29. The UE of claim 25, wherein a base station to which the PEI response is transmitted does not have beam reciprocity with the UE; wherein a PEI occasion, of the first quantity of PEI occasions, is mapped to multiple PEI response occasions, of the second quantity of PEI response occasions; wherein the multiple PEI response occasions are associated with multiple transmission beams of the UE, and wherein the one or more processors, to transmit the PEI response, are configured to:

transmit the PEI response via the multiple transmission beams according to the multiple PEI response occasions based at least in part on detecting the PEI during the PEI occasion.

30. The UE of claim 23, wherein the one or more processors are further configured to:

receive an indication of a PEI response occasion and an association between the PEI response occasion and a PEI occasion, wherein the PEI is received during the PEI occasion and the PEI response is transmitted during the PEI response occasion.

* * * * *